March 24, 1970   C. L. ESHELMAN   3,502,362
SHOCK ABSORBING TIRE BUFFER

Filed July 30, 1968    2 Sheets-Sheet 1

INVENTOR
Cheston Lee Eshelman

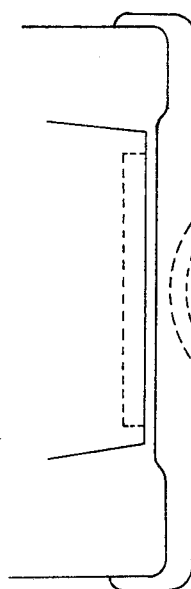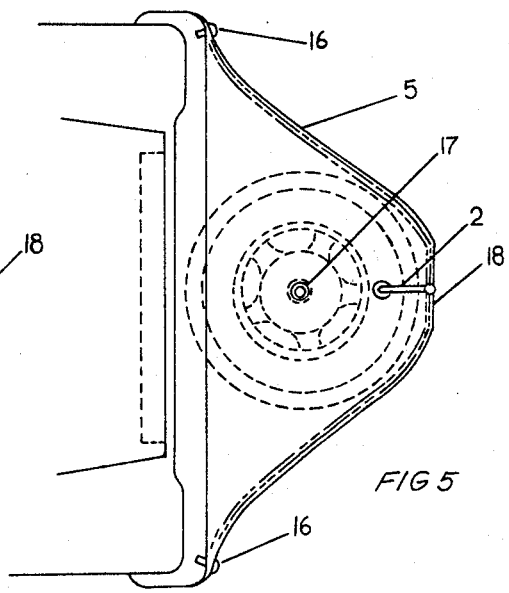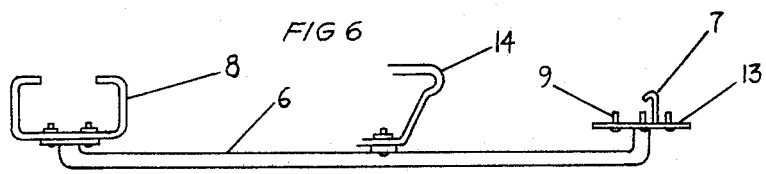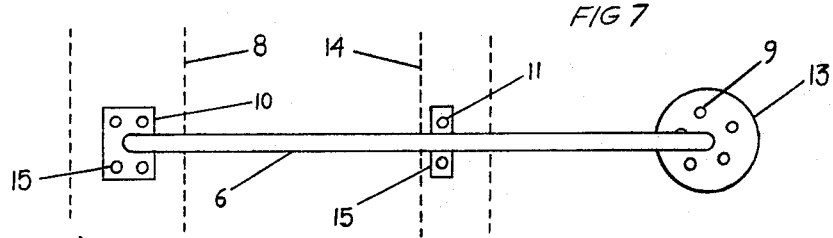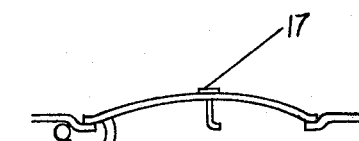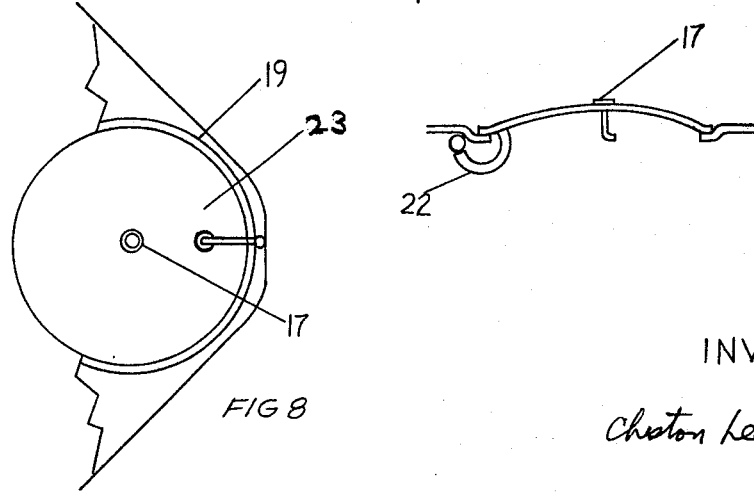

United States Patent Office 3,502,362
Patented Mar. 24, 1970

3,502,362
SHOCK ABSORBING TIRE BUFFER
Cheston Lee Eshelman, 621 NE. 30th Terrace,
Miami, Fla. 33137
Filed July 30, 1968, Ser. No. 748,785
Int. Cl. B60r *19/10;* B62d *43/04;* B61f *19/04*
U.S. Cl. 293—19                                    10 Claims

ABSTRACT OF THE DISCLOSURE

In an automotive highway vehicle, a vehicle wheel and wheel-mounted pneumatic tire positioned at the front of the vehicle immediately in front of the bumper with the wheel and tire substantially parallel to the highway surface and having means for supporting said wheel and tire in that position, the supporting means being rigidly connected to the front axle cross member, then extending horizontally forward with means at its forward end for removably mounting the wheel thereon. A removable cover for the wheel is provided to protect it from the elements, and a guide is removably attached to the wheel to aid the driver to operate the vehicle.

---

My invention relates to an improvement in a crash absorber for an automotive highway vehicle using the spare tire and wheel, and this is mounted to the front of the vehicle so that it will operate to absorb the energy of a collision, to offer "crash-worthiness," and to protect the occupants from death or injury, while still remaining available as a spare tire and wheel.

With the ever-increasing use of express highways and the high cruising speed of modern automobiles plus the in creased number of vehicles on the roads, there is a steady increase in traffic collisions with many deaths and serious injuries due to high speed collision with a barrier or head-on collision into an oncoming vehicle. One can hardly read a newspaper or watch the news on television without seeing a head-on collision of an automobile resulting in fatalities and injuries.

With all of the developments in modern passenger automobiles, trucks, busses, and station wagons, including the engines and bodies, the bumpers have been neglected by the industry. The modern bumper has been found to be as ornamental feature rather than what its name implies.

The standard pneumatic tire and pressed steel wheel are very rugged and will resist being compressed out of their round shape. In most serious accidents, where the vehicle body is compressed out of shape and the engine is torn from its mounts, the spare tire and wheel are not damaged, nor are the wheels on the vehicle.

There are between twenty-six and twenty-nine inches of absorption material, measured along a diameter of the wheel, consisting, in order, of a layer of rubber and cord, a layer of compressed air, a pressed steel wheel, another layer of compressed air, and another layer of rubber and cord. All these layers must be collapsed before the struck object can reach the front bumper of the vehicle.

The advantages of this thickness of absorption materials are obvious in absorbing the energy of collision and decelerating the vehicle whereby fatalities, serious injuries, and property damage are reduced by an estimated 50%. Tests have shown that a car equipped as described above can drive head on into a concrete wall at 50 miles per hour and not break the headlights.

It is an object of my invention to supply a absorption device which I have named the "crash absorber." This device will absorb the energy of a collision to an extent far greater than is possible with a pressed steel, chrome plated bumper.

It is a further object of my invention to provide small, medium, and large automobiles, trucks, busses, and station wagons with the disclosed crash-absorbent mounted as described.

It is a still further object of my invention to move the spare tire and wheel from the trunk of the vehicle or other storage space and to mount them on the vehicle in front of the front bumper and substantially parallel with the road surface.

It is another object of my invention to so mount the crash absorbing wheel on the front of the vehicle that it will be interposed between the vehicle and any barrier with which a collision may occur.

It is yet another object of my invention to provide the crash absorber with a removable cover to protect it from the elements and to place a removable guide on it to aid the driver in operating the vehicle.

Further objects of this invention may be apparent by references to the accompanying detailed description and the drawings in which:

FIGURE 4 is a front plan view showing the spare tire and wheel in position with a removable type of case;

FIGURE 5 is a front plan view showing the spare tire and wheel in position with a fixed case that blends into the edges of the vehicle with an access door to open and remove the tire and wheel;

FIGURE 6 is a side view of the longitudinal support frame;

FIGURE 7 is the bottom plan view looking up, showing the longitudinal support frame;

FIGURE 8 is a top plan view showing details of the access door in the fixed position type of case shown in FIGURE 5;

FIGURE 9 is a side elevation view of FIGURE 8, showing a hinge and lock.

Figure 1:
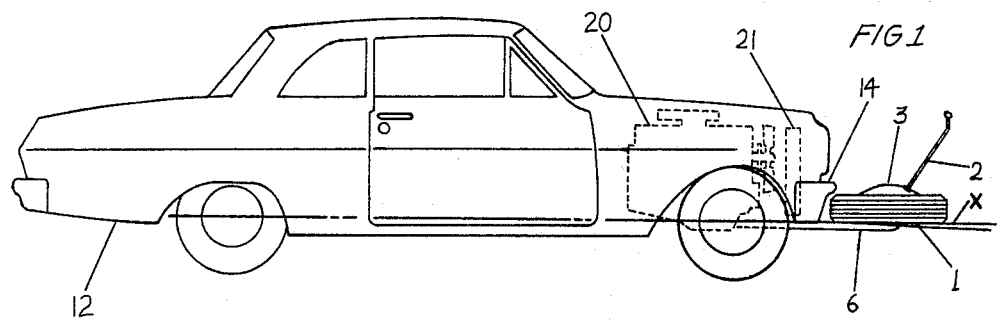
FIGURE 1 is a side elevation view showing the spare tire and wheel in position in the front of the vehicle.
Figure 2:
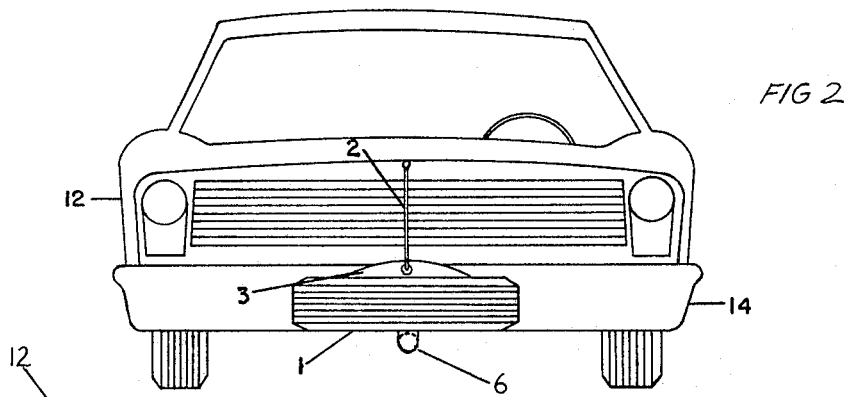
FIGURE 2 is a front view showing the spare tire and wheel in position at the bumper level.
Figure 3:
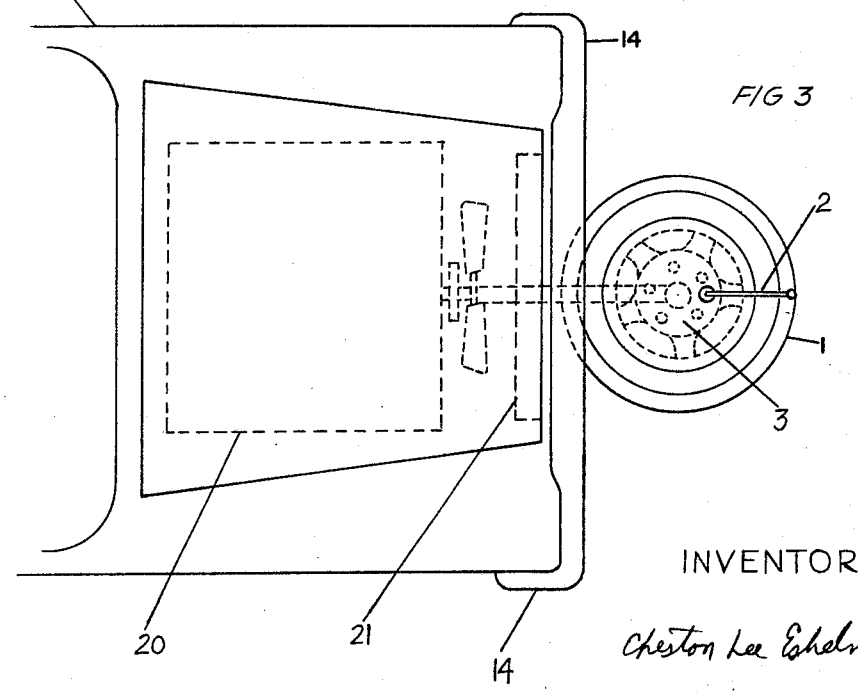
FIGURE 3 is a top plan view showing the spare tire and wheel in position substantially parallel to the road.

Reference to the drawings, and particularly FIGURES 1 through 3, show this invention to illustrate how the tire 1 and wheel, held in place substantially horizontally by the longitudinal support frame 6, will act as a crash absorber.

FIGS. 1 to 3 show the tire and wheel in front of the bumper 14, radiator 21, engine 20, and car body 12. I have provided a guide 2 for the driver to see the front of the vehicle. This guide is threaded at the bottom and bolts to the wheel cover 3. This wheel cover is removable to get to the wheel stud nuts for removing the tire and wheel. Referring to FIGURE 4, it is the object of my invention to have a case for the purpose of appearance and for the purpose of protecting the tire and wheel against the weather. Said case does not contribute greatly to the "crash-worthiness" of my invention, and it is not necessary to have the cases on the wheel and tire. Two types of cases are provided: a removable type case 4, as shown in FIGURE 4, or a fixed case 5 with an access door, as shown in FIGURE 5. The case is made of a thin wall, steel or fiber glass material, which slides over the tire and up to the front bumper, and is held in place by a lock 17, that latches to a keeper 7, welded to the plate 13. To remove the spare tire and wheel, turn the lock and pull off the case, FIGURE 4. Remove the nuts from the studs 9. Do the opposite to install.

Returning now to FIG. 1 it should be particularly noted that the tire and wheel 1 are so mounted as to be slightly tilted upwardly in the forward direction. In FIG. 1 the angle of tilt is indicated by X. The angle of tilt of the crash absorber is determined by the type of vehicle upon which the device is mounted. It is well known that bumper heights vary widely between small autos, large autos, trucks, etc. Thus the device requires a greater angle of tilt when mounted on small compacts so it will not ride under the higher bumpers of large autos and trucks. Similarly, the angle of tilt is less, or even no tilt at all if the device is mounted on large vehicles with high bumpers.

In FIGURE 5, the case is fixed by bolting 16 at each end through the bumper at the outside edge of the car. To remove the spare tire from the fixed case, turn the lock 17, lift the door 4, remove the nuts from studs 9. Do the opposite to install.

FIGURES 4 and 5 have a flat spot on the front of the case for a license plate holder 18. The guide 2 is bolted to the front end of the cases. FIGURES 4 and 5 are similar in side and front views to FIGURES 1 and 2, and therefore are not shown.

Referring now to FIGURES 6 and 7, this construction deals with the longitudinal support frame 6 which is made from a steel bar or steel tubing. At the rear, it bolts to the front axle cross member 8 by a plate 10, which is welded to the bar 6. Four bolts 15 are used. Moving forward, the plate 11 is welded to the bar 6 at the location of the front bumper, and two bolts 15 are secured to the under side of the bumper 14. Moving forward to the front, a hub plate 13 is welded to the bar 6, and has studs 9 and a lock keeper 7 welded to the plate. These are located to fit the wheel.

Referring now to FIGURES 8 and 9, this construction deals with details of the access door 23 on the fixed case 5, shown in FIGURE 5. This door frame 19 is slightly larger than the O.D. of the tire and is located in the top of the surface of the case 5. To open the door, turn the lock 17 and lift the door, on hinge 22, then remove the nuts from studs 9 and remove the spare tire and wheel. Do the opposite to install.

What I claim is:

1. In an automotive highway vehicle having a front axle cross member, a front end, and a bumper mounted transversely of the vehicle on the front end; an arrangement for reducing the severity of a collision between said vehicle and an object in front of it, comprising a wheel and wheel-mounted pneumatic tire positioned substantially parallel to the highway surface in front of said bumper and at the same level thereof, with one portion of the periphery of said tire closely adjacent the front surface of said bumper, and means for rigidly connecting said wheel to the front axle cross member.

2. The structure of claim 1 in which the portion of the tire closely adjacent the bumper is in contact with the bumper.

3. The structure of claim 2 in which the forward portion of the wheel and tire remote from the bumper is slightly higher than the portion adjacent the bumper.

4. The structure of claim 1 in which the portion of the tire closely adjacent the bumper is slightly spaced therefrom.

5. The structure of claim 4 in which the forward portion of the wheel and tire remote from the bumper is slightly higher than the portion adjacent the bumper.

6. The structure of claim 1 in which the means rigidly connecting the wheel to the front axle cross member includes quickly removable bolt means for maintaining the wheel fixed to said connecting means.

7. The structure of claim 1 in which a guide rod is removably connected to the wheel and extends vertically therefrom into the line of vision of a vehicle driver as an aid in operation of the vehicle.

8. The structure of claim 1 in which the forward portion of the wheel and tire remote from the bumper is slightly higher than the portion adjacent the bumper.

9. The structure of claim 1 in which the means for rigidly connecting said wheel to said front axle cross member is a steel bar rigidly connected at its rearward end to said front axle cross member and at its forward end has a rigidly connected hub plate which includes means for securely and removably mounting said wheel thereon.

10. The structure of claim 1 in which a removable case is provided for covering the wheel and tire and protecting them from the elements, said case having a central part closely conforming to the forward portion of the wheel and tire and having side parts extending from the central part to connections with the ends of the bumper.

References Cited

UNITED STATES PATENTS

| | | | |
|---|---|---|---|
| 981,260 | 1/1911 | Harris | 293—71 |
| 1,348,030 | 7/1920 | Millard | 293—71 |
| 1,515,565 | 11/1924 | Finnegan | 293—71 |
| 1,536,111 | 5/1925 | Lier | 224—42.06 |
| 1,566,991 | 12/1925 | Sonnenfeld | 293—71 |
| 1,672,335 | 6/1928 | O'Meara | 293—71 |
| 1,698,207 | 1/1929 | Van Gelder | 293—85 |
| 1,753,483 | 4/1930 | Stevens | 224—42.04 |
| 1,834,824 | 12/1931 | Brown | 293—71 |
| 2,146,642 | 2/1939 | Mueth | 293—73 |
| 2,179,163 | 11/1939 | Roth | 293—42 |
| 2,196,225 | 4/1940 | Morrison | 224—42.04 |
| 2,230,516 | 2/1941 | Radtke | 293—73 XR |
| 2,274,440 | 2/1942 | Tozier | 224—42.04 |
| 2,358,481 | 9/1944 | Slack | 224—42.04 |
| 2,585,530 | 2/1952 | Bennett | 293—73 XR |
| 2,603,527 | 7/1952 | Perkins | 293—69 XR |
| 2,829,915 | 4/1958 | Clareau | 293—71 |
| 2,935,330 | 5/1960 | Millman | 293—19 XR |
| 3,074,751 | 1/1963 | Gerin | 293—62 XR |
| 3,140,111 | 7/1964 | Dabroski | 293—62 XR |
| 3,210,110 | 10/1965 | Chieger | 293—73 |
| 3,226,146 | 12/1965 | Behr | 293—60 XR |
| 3,330,455 | 7/1967 | Cooper | 224—42.06 |
| 3,343,736 | 9/1967 | Sellers | 224—42.06 |

ARTHUR L. LA POINT, Primary Examiner

H. BELTRAN, Assistant Examiner

U.S. Cl. X.R.

29—49; 224—42.04; 293—71